United States Patent [19]

Epstein

[11] 3,865,983

[45] Feb. 11, 1975

[54] ACOUSTIC COUPLER SYSTEM FOR USE WITH COMMON CARRIER COMMUNICATION LINES

[75] Inventor: Barry M. Epstein, Dallas, Tex.

[73] Assignee: Action Communications Systems, Inc., Dallas, Tex.

[22] Filed: Dec. 14, 1972

[21] Appl. No.: 315,213

[52] U.S. Cl. .............................................. 179/2 DP

[51] Int. Cl. .......................................... H04m 11/06

[58] Field of Search ............ 179/2 DP, 2 A, 3, 1 C, 179/2 C, 4; 178/66 R; 340/172.5, 150, 214

[56] References Cited

UNITED STATES PATENTS

| | | | |
|---|---|---|---|
| 2,081,312 | 5/1937 | Thorp | 178/66 R |
| 2,464,837 | 3/1949 | Werthmann | 178/66 R |
| 2,887,534 | 5/1959 | Fulling | 179/3 |
| 2,910,535 | 10/1959 | Terlecki | 178/66 R |
| 3,002,052 | 9/1961 | Emker | 178/66 R |
| 3,033,997 | 5/1962 | Salihi | 178/66 R |
| 3,076,056 | 1/1963 | Stoffels | 179/3 |
| 3,141,066 | 7/1964 | Cotterill | 178/66 R |
| 3,213,200 | 10/1965 | Vogelman | 179/3 |
| 3,368,028 | 2/1968 | Windels | 340/172.5 |
| 3,370,124 | 2/1968 | Neiswinter | 179/2 DP |
| 3,506,784 | 4/1970 | Garland | 178/66 R |
| 3,544,721 | 12/1970 | Van Geen | 179/2 DP |

*Primary Examiner*—Kathleen H. Claffy
*Assistant Examiner*—Thomas D'Amico
*Attorney, Agent, or Firm*—Richards, Harris & Medlock

[57] ABSTRACT

This specification discloses a system for coupling to a common carrier communications line over which digital data is transmitted to and from a plurality of data terminals under the control of a computer. The system is connected across a selected common carrier communication line through a test panel at the computer site. A first relay is connected to the test panel for being switched in response to digital current variations appearing on the line. A source of voltage is connected to a contact of the first relay such that the relay generates digital voltage signals. A first acoustic coupler is connected to the first relay for receiving the digital voltage signals therefrom and for converting the voltage signals into tone signals for application to a conventional telephone line. A second acoustic coupler at a remote site is coupled to the telephone line and converts the tone signals into digital voltage signals for operating a teleprinter. If desired, data may be input into the remote teleprinter and transmitted through the second acoustic coupler to the first acoustic coupler. A second relay is connected to the output of the first acoustic coupler for being switched in response to digital voltage variations appearing thereon. The second relay is also connected to the common carrier communication line for applying digital current variations to the line.

5 Claims, 1 Drawing Figure

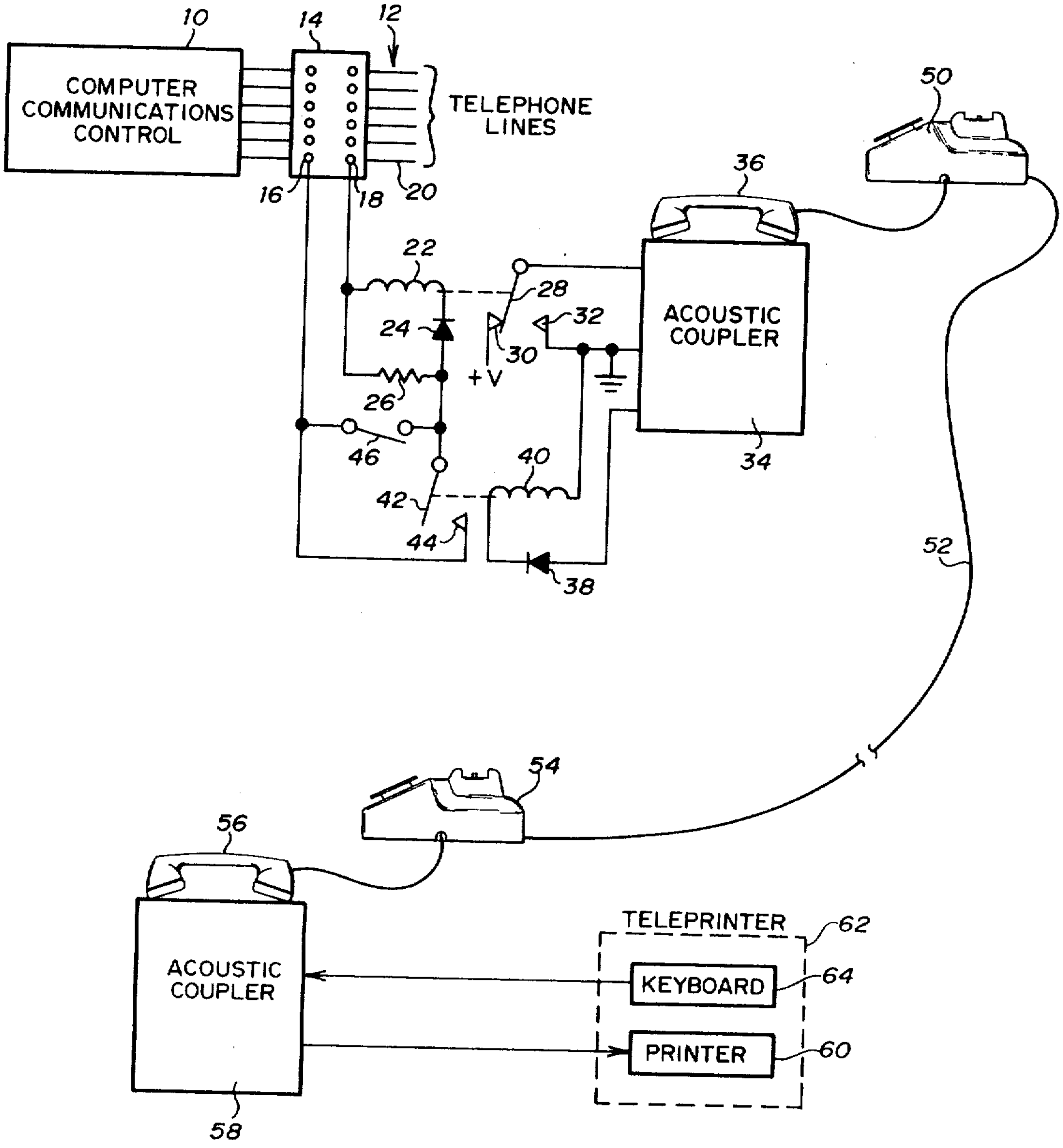
10
14
12
COMPUTER COMMUNICATIONS CONTROL
TELEPHONE LINES
16
18
20
50
36
22
28
32
24
30
+V
ACOUSTIC COUPLER
26
46
34
40
42
44
38
52
54
56
ACOUSTIC COUPLER
TELEPRINTER
62
KEYBOARD
64
PRINTER
60
58

ACOUSTIC COUPLER SYSTEM FOR USE WITH COMMON CARRIER COMMUNICATION LINES

FIELD OF THE INVENTION

This invention relates to systems for coupling with common carrier communication lines and more particularly relates to systems for coupling digital data between a common carrier communication line and a remote station.

THE PRIOR ART

Computer controlled communication processor systems are commonly utilized to control the transmission and reception of digital data over leased common carrier communication lines such as telephone lines. An example of such a computer controlled communication processor system is disclosed in the copending patent application Ser. No. 288,734, filed Sept. 13, 1972 entitled "Binary Synchronous Communications Processor" and assigned to the present Assignee.

Conventionally, such communication processor systems utilize a properly programmed general purpose digital computer for controlling the operation of a plurality of leased telephone lines, each of the telephone lines having a plurality of teleprinter data terminals connected thereto. With the use of such processor systems, extremely accurate and economical use of the teleprinters is provided, and communication is enabled over a wide variety of data transmission rates, circuit characteristics, line conventions and terminals.

It is often necessary to have the capability of reviewing the digital data appearing on selected common carrier communication lines in such communications processor systems. Console teletypes at the computer site have thus been previously utilized to print out the digital information appearing on a selected communications line, in order to enable diagnosis of malfunctions of the system and to provide for testing of the system at the computer location. However, it would be desirable to enable communication between a selected common carrier communications line and a remote station, in order to enable the diagnosis of malfunctions of the system without the requirement of expensive travel of a maintenance operator. Moreover, it has been found desirable to provide for testing of a computer controlled processor system at a remote station prior to shipment of the computer controlled communications processor. It would also be desirable to provide for alternate common carrier communication links, in case of a malfunction of a particular leased line.

SUMMARY OF THE INVENTION

In accordance with the present invention, a system is provided for coupling to a selected common carrier communication line in a computer controlled communications system to enable the input and output of digital data between the line and a remote station. The present system thus enables testing of a communications processor with the existing common carrier lines prior to shipping of the communications processor, and also enables remote diagnosis of malfunctions in an existing communications processor station. Moreover, the present system enables the use of an alternate dial-up communications link in case of malfunction of a particular common carrier line.

In accordance with the present invention, a system having substantially the same impedance as a teleprinter is provided for coupling to a digital communications line. The system includes circuitry for sensing digital current variations in the communications line and for converting the current variations into voltage variations. Circuitry converts the voltage variations into tone signals and transmits the tone signals over a conventional telephone line to a remote station. Circuitry is provided at the remote station for operating a data terminal in response to the tone signals.

In accordance with another aspect of the invention, a data terminal is located at a remote station for generating digital data. Circuitry is provided to transmit the digital data over a conventional telephone line to a computer station wherein the operation of a plurality of digital common carrier lines is controlled. Circuitry at the computer station converts the received digital data into voltage variations. Circuitry also converts the voltage variations into current variations and applies the current variations to a selected one of the common carrier lines.

In accordance with a more specific aspect of the invention, a system is provided for coupling to a common carrier communication line wherein digital data is transmitted to and received from a plurality of data terminals under the control of a computer. Circuitry is operated to switch a first relay in response to digital current variations in the common carrier communication line. A source of voltage is connected to a contact of the first relay. An acoustic coupler is connected to the first relay for receiving digital voltage signals therefrom and for converting the voltage signals into tone signals which are coupled onto a telephone line. A second relay is connected to the output of the acoustic coupler for being switched in response to digital voltage variations. The second relay is coupled to the common carrier communications lines for applying digital current variations thereto. A second acoustic coupler is provided at a remote station for receiving tone signals and for converting the tone signals into voltage signals for operation of a teleprinter at the remote station. Alternatively, information applied through the remote teleprinter is converted by the second acoustic coupler into tone signals and transmitted to the computer station.

DESCRIPTION OF THE DRAWING

For a more complete understanding of the present invention and for further objects and advantages thereof, reference is now made to the following description taken into conjunction with the accompanying drawing, in which the drawing is a schematic diagram of the present coupling system.

DESCRIPTION OF THE PREFERRED EMBODIMENT

Referring to the FIGURE, a computer communications control system 10 comprises, for example, the control system described in the previously noted copending patent application Ser. No. 288,734 and assigned to the present assignee. The computer control system 10 controls the transmission of digital data over a plurality of common carrier communications lines 12, which may comprise, for example, leased telephone lines. A conventional test panel 14 is connected to the telephone lines 12 to enable selective tapping into one of the telephone lines for testing or for connection of auxiliary equipment. A plurality of data terminals such as teleprinters (not shown) are conventionally connected along the telephone lines 12 in series. Digital data may be input to and output from the teleprinters under the control of the computer communications control system 10. As it well known, the teleprinters are connected along the telephone lines 12 in a current loop, with digital data being transmitted by "making and breaking" the current on the telephone lines.

The present invention may be connected across any of the terminals in the test panel 14 in order to enable communication with a selected common carrier communications line. In the embodiment shown, the system is connected to terminals 16 and 18 in order to connect the system in series with a telephone line 20. A first relay coil 22 is connected with terminal 18. A diode 24 is connected in series with the coil 22, with a resistor 26 being connected across the coil 22 and the diode 24. An important aspect of the invention is that the resistor 26 is selected to provide substantially the same impedance as a conventional teleprinter.

The relay coil 22 operates a relay switch member 28 which may be switched between contacts 30 and 32. Relay contact 30 is connected to a source of positive voltage, while relay contact 32 is connected to circuit ground. The relay switch member 28 is connected to the input of a conventional acoustic coupler 34. As is well known, acoustic couplers include two transducers spaced apart to receive the mouthpiece and earpiece of a conventional telephone handset 36. The voltage which is applied to the input of the acoustic coupler 34 is applied to the transducer which receives the mouthpiece, and the voltage is converted into tone signals and acoustically coupled into the mouthpiece of the handset 36. Alternatively, tone signals which are generated from the earpiece of the handset 36 are received by the second transducer and converted into voltage signals which are applied at the output of the acoustic coupler 34.

A diode 38 is connected to the output of the acoustic coupler 34 and is connected in series with a second relay coil 40, the terminal of which is connected to circuit ground. The relay coil 40 controls the operation of a relay switch member 42 in order to switch the switch member 42 into and out of contact with a relay contact 44. Contact 44 is connected directly to the terminal 16 of the test panel 14. A switch 46 is connected across the terminal 16 of the test panel 14 and the relay switch member 42. Thus, when the switch 46 is closed, the circuitry connected to the output of the acoustic coupler 34 is shorted out of operation.

The handset 36 is connected to a conventional telephone unit 50 which may be connected by a conventional telephone dial-up link 52 to a telephone unit 54 located at a remote location. The handset 56 of the telephone unit 54 is connected to a second acoustic coupler 58. A transducer within the acoustic coupler 58 receives tone signals from the earpiece of the handset 56 and converts the tone signals into voltage signals and applies the voltage signals to the printer 60 of a conventional teletype 62. The keyboard 64 of teletype 62 may be operated to generate voltage signals in the conventional manner which are applied to the acoustic coupler 58. The voltage signals are applied to the transducer receiving the mouthpiece of the handset 56, whereupon the voltage signals are converted into tone signals and applied through the mouthpiece to the telephone unit 54 for transmission to the computer station.

In the operation of the system shown in the drawing, it will initially be assumed that it is desired to review the operation of the teleprinters connected to the telephone line 20. The switch 46 is closed to short out the second relay coil 40 and relay switch member 42. Digital current variations are thus applied from the line 20 to the circuitry of the invention via terminals 16 and 18. When current is present on the telephone line 20, the relay coil 22 is energized to close the relay switch member 28 against terminal 30 to apply positive voltage to the acoustic coupler 34. When no current appears on the telephone line 20, the relay coil 22 is de-energized and the switch member 28 is closed against contact 32. Thus, the present system acts as a current-to-voltage converter to apply a digital voltage signal to the acoustic coupler 34. The acoustic coupler 34 then converts the voltage signals to tone signals and applies the tone signals to the handset 36 and via the telephone link 52 to the telephone set 54. The digital tone signals are then applied to the acoustic coupler 58, which then converts the tone signals to digital voltages and applies the voltages to the teleprinter 60. The digital data is then printed out on the printer 60 so that the operator at the remote station may inspect the operation of the various data stations connected to the telephone line 20.

The resistor 26 is chosen to provide substantially the same impedance across terminals 16 and 18 as the impedance provided by a conventional teleprinter, and thus the connection of the present system does not interrupt normal operation of the telephone line 20.

The present system is thus extremely useful in enabling a remote diagnosis of malfunctions occurring at the computer communications control station 10. In addition, the present system enables use of an alternative line of communication in case of breakdown or malfunction of the telephone line 20. Moreover, the invention enables remote testing of the computer communications control system at a remote station prior to installation of the computer communications control.

When it is desired to input data to the telephone line 20, the switch 46 is opened. The keyboard 64 may then be operated by the operator at the remote station to apply digital voltage signals to the acoustic coupler. The acoustic coupler converts the signals into digital tone signals and applies the digital tone signals to the handset 56 and via the telephone link 52 to the telephone unit 50. The digital tone signals are then applied from the handset 36 to the acoustic coupler 34. The digital tone signals are converted by the acoustic coupler 34 into digital voltage signals which are then applied from the output of the acoustic coupler 34 to the relay coil 40. The digital voltage signals cause intermittent closing of the relay switch 42 against the contact 44. This causes "make or break" current signals to be applied across the terminals 16 and 18 to transmit digital data onto the telephone line 20. In this manner, the operator at a remote station can input desired digital diagnostic data or other communication data onto the printer 60 and place the desired digital data onto the telephone line 20.

It will be understood that if desired, the present system may be connected to any of the remaining telephone lines 12 to enable communication to and from any desired telephone line.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A testing system for coupling to a plurality of common carrier communications lines wherein digital data is transmitted to and received from a plurality of data terminals under the control of a computer comprising:

means for selective connection to one of said common carrier communications lines, means connected with said selective connection means for converting current variations in said selected common carrier communications line representative of said digital data to voltage variations, said current variation converting means including a first relay having a coil connected in series with said selected common carrier communications line, and further having a first switch controlled by said first relay and being positionable by said first relay for engagement with a first contact connected to a source of voltage and a second contact connected to circuit ground, said current variation converting means also including means having substantially the same impedance characteristics as one of said date terminals, means for converting said voltage variations into tone signals and for coupling said tone signals to a conventional telephone link, means at a remote station for displaying said digital data in response to said tone signals, means at said remote station for inputting tone signals representative of digital data onto said telephone link, means at said common carrier communications line for receiving said tone signals from said remote station and for converting said tone signals into voltage variations, means connected with said tone signal converting means for receiving said voltage variations therefrom and for converting said voltage variations into current variations, said means including a second relay and a second switch controlled by said second relay, and means for connecting said second switch with said selective connection means and said current variation converting means for thereby inputting said current variations into said selected common carrier communications line for operation of said data terminals connected therewith.

2. The system of claim 1 wherein said means for converting said voltage variations into tone signals and said means for converting said tone signals into voltage variations comprises an acoustic coupler.

3. In a testing system for coupling to a plurality of common carrier communications lines wherein digital data is transmitted to and received from a plurality of data terminals under the control of computer, the combination comprising:

means for coupling across a selected one of said common carrier communications lines, a first relay connected to said coupling means for being switched in response to digital current variations in said selected common carrier communications line, a resistance connected across the coil of said first relay for simulating the impedance of a data terminal, a source of voltage connected to a contact of said first relay, wherein switching of said first relay causes the generation of digital voltage signals, an acoustic coupler connected to said first relay for receiving said digital voltage signals and in response thereto for coupling tone signals onto a telephone line, a second relay connected to the output of said acoustic coupler for being switched in response to digital voltage variations generated from said acoustic coupler in response to tone signals received from the telephone line, and means for connecting said relay to said selected common carrier communications line for applying digital current variations thereto.

4. The combination of claim 3 and further comprising means for switching said second relay into and out of connection with said common carrier communications line.

5. The combination of claim 3 wherein said means for coupling comprises plugs for being connected into a telephone test panel attached to said common carrier communications lines.

* * * * *